United States Patent
Cheng et al.

(10) Patent No.: US 11,429,574 B2
(45) Date of Patent: Aug. 30, 2022

(54) COMPUTER SYSTEM DIAGNOSTIC LOG CHAIN

(71) Applicant: International Business Machines Corporation, Armonk, NY (US)

(72) Inventors: Quan Q C Cheng, Beijing (CN); Xiang Qiu, Beijing (CN); Zhi Wei Du, Beijing (CN); Peng Hui Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 16/839,261

(22) Filed: Apr. 3, 2020

(65) Prior Publication Data

US 2021/0311918 A1 Oct. 7, 2021

(51) Int. Cl.
*G06F 16/00* (2019.01)
*G06F 16/215* (2019.01)
*G06N 20/00* (2019.01)
*G06F 16/22* (2019.01)

(52) U.S. Cl.
CPC ........ *G06F 16/215* (2019.01); *G06F 16/2255* (2019.01); *G06N 20/00* (2019.01)

(58) Field of Classification Search
None
See application file for complete search history.

(56) References Cited

U.S. PATENT DOCUMENTS

| | | |
|---|---|---|
| 9,262,519 B1 | 2/2016 | Saurabh et al. |
| 10,366,096 B2 | 7/2019 | Ferrar |
| 2015/0287059 A1* | 10/2015 | Ouyang ........... G06Q 10/06393 705/7.31 |
| 2015/0288465 A1* | 10/2015 | Ouyang ................. H04B 17/18 455/67.11 |
| 2018/0276109 A1* | 9/2018 | Archer ................ G06F 11/3684 |
| 2019/0179691 A1 | 6/2019 | Xu et al. |

OTHER PUBLICATIONS

"Frequent Pattern Mining—RDD—based API", Spark.apache.org, https://spark.apache.org/docs/2.3.0/mllib-frequent-pattern-mining.html, Feb. 24, 2020, 4 pgs.
"SimHash", Wikipedia, https://en.wikipedia.org/wiki/SimHash, Dec. 19, 2019, 2 pgs.

* cited by examiner

*Primary Examiner* — Bai D Vu
(74) *Attorney, Agent, or Firm* — Rakesh Roy; Hunter E. Webb; Keohane & D'Alessandro, PLLC

(57) ABSTRACT

Disclosed embodiments provide a computer-implemented technique for creating a log chain from multiple software component logs. The log chain can include log information from multiple software components that interact with each other. In embodiments, a locality-sensitive hashing technique is used to create a signature of a log chain. Machine-learning systems are trained with log chains generated from test execution, and/or log chains from incidents with deployed software. In embodiments, logs are pre-processed by tokenizing and trimming. Logs from various components that interact with each other may be combined into a temporally sequential log chain. The signature of the log chain may be used to identify additional information about the error from a machine-learning process that was trained on previously generated log chains. In this way, the time required to identify a problem can be significantly reduced, resulting in increased reliability and availability of complex computer systems.

20 Claims, 14 Drawing Sheets

```
20200302 18:38:13.520 DEBUG    remoteApp.log.app.ServiceA- IoT_Detection_CallbackRegister
Enter
20200302 18:38:13.871 ERROR    remoteApp.log.app.ServiceA- IoT_DetectionCallbackInit at
line 115 in file IoT_DetectCB.c
20200302 18:38:14.512 DEBUG    remoteApp.log.app.ServiceA- RegisteringCallback at
0x87364356
20200302 18:38:14.671 ERROR    remoteApp.log.app.ServiceB- ZIoT_CB_Reg Enter
20200302 18:38:15.522 DEBUG    remoteApp.log.app.ServiceA- ReceivedAck
20200302 18:38:16.580 ERROR    remoteApp.log.app.ServiceB- ZIoT_DeviceProfileGet()
20200302 18:38:18.520 WARN     remoteApp.log.app.ServiceB- Socket Timeout at line 6128 in
file ZSocket.c
20200302 18:38:19.520 INFO     remoteApp.log.app.ServiceB- Retrying Socket... at line
6087 in file ZSocket.c
20200302 18:38:19.720 INFO     remoteApp.log.app.ServiceC-
DeviceRegister_Database_Create() in file AthDB.c
20200302 18:38:20.120 INFO     remoteApp.log.app.ServiceC- Record Created at 0x7243874
20200302 18:38:20.520 INFO     remoteApp.log.app.ServiceD- Record Posted at line 609 in
file BlastPost.c
20200302 18:38:21.220 DEBUG    remoteApp.log.app.ServiceC- Device Registration Complete
20200302 18:38:21.520 INFO     remoteApp.log.app.ServiceB- Device Profile Acquired
20200302 18:38:23.320 DEBUG    remoteApp.log.app.ServiceA- Callback Registration Complete
```

FIG. 5

```
20200302 18:39:13.520 DEBUG    remoteApp.log.app.ServiceA- IoT_Detection_CallbackRegister Enter
20200302 18:39:13.871 ERROR    remoteApp.log.app.ServiceA- IoT_DetectionCallbackInit at line 115 in file IoT_DetectCB.c
20200302 18:39:14.512 DEBUG    remoteApp.log.app.ServiceA- RegisteringCallback at 0x87364356
20200302 18:39:14.671 ERROR    remoteApp.log.app.ServiceB- ZIoT_CB_Reg Enter
20200302 18:39:15.522 DEBUG    remoteApp.log.app.ServiceB- ReceivedAck
20200302 18:39:16.580 ERROR    remoteApp.log.app.ServiceB- ZIoT_DeviceProfileGet()
20200302 18:39:18.520 WARN     remoteApp.log.app.ServiceB- Socket Timeout at line 6128 in file zSocket.c
20200302 18:39:19.520 INFO     remoteApp.log.app.ServiceB- Retrying Socket... at line 6087 in file zSocket.c
20200302 18:39:19.542 INFO     remoteApp.log.app.ServiceC- DeviceRegister_Database_Create() in file AthDB.c
20200302 18:39:19.764 ERROR    remoteApp.log.app.ServiceC- error -> Uninitialized Memory Array at line 976 in file AthDB.c
20200302 18:39:20.120 FATAL    remoteApp.log.app.ServiceC- Aborting
20200302 18:39:20.220 FATAL    remoteApp.log.app.ServiceB- Aborting
20200302 18:39:21.420 FATAL    remoteApp.log.app.ServiceA- LogMarker: return code 0xDEA909
20200302 18:39:21.570 FATAL    remoteApp.log.app.ServiceA- Callback Registration Failed
```

FIG. 6

```
20200302 18:39:14.671 ERROR  remoteApp.log.app.ServiceB- ZIoT_CB_Reg Enter
20200302 18:39:16.580 ERROR  remoteApp.log.app.ServiceB- ZIoT_DeviceProfileGet()
20200302 18:39:18.520 WARN   remoteApp.log.app.ServiceB- Socket Timeout at line 6128 in
file ZSocket.c
20200302 18:39:19.520 INFO   remoteApp.log.app.ServiceB- Retrying Socket.... at line
6087 in file ZSocket.c
20200302 18:39:19.542 INFO   remoteApp.log.app.ServiceC-
DeviceRegister_Database_Create() in file AthDB.c
20200302 18:39:19.764 ERROR  remoteApp.log.app.ServiceC- Uninitialized Memory Array at
line 976 in file AthDB.c
20200302 18:39:20.120 FATAL  remoteApp.log.app.ServiceC- Aborting
20200302 18:39:20.220 FATAL  remoteApp.log.app.ServiceB- Aborting
```

┌502─┐ ┌─504─┐ ┌──────506──────┐  ┌─────────508─────────┐
802 ─┤ 20200302 18:38:13.520 DEBUG  remoteApp.log.app.ServiceA- (8726) dropbear_login_auth INIT
     │ 20200302 18:38:13.871 ERROR  remoteApp.log.app.ServiceA- IoT_DetectionCallbackInit at line 115 in
     │ file IoT_DetectCB.c
804 ─┤ 20200302 18:38:14.512 DEBUG  remoteApp.log.app.ServiceA- (10852) dropbear_login_auth INIT
     │ 20200302 18:38:14.671 ERROR  remoteApp.log.app.ServiceB- ZIoT_CB_Reg Enter
                                                                        └─824
806 ─┤ 20200302 18:38:15.522 DEBUG  remoteApp.log.app.ServiceA- (8726) dropbear_login_auth SUCCESS
     │ 20200302 18:38:16.580 ERROR  remoteApp.log.app.ServiceB- ZIoT_DeviceProfileGet()
     │ 20200302 18:38:18.520 WARN   remoteApp.log.app.ServiceB- Socket Timeout at line 6128 in file
     │ ZSocket.c
808 ─┤ 20200302 18:38:10.101 ERROR  remoteApp.log.app.ServiceA- (10852) error -> dropbear_login_auth cannot
     │ open identity file
     │ 20200302 18:38:19.458 ERROR  remoteApp.log.app.ServiceB- (10852) error -> dropbear_login_auth FAILED
810 ─┤ 20200302 18:38:19.520 INFO   remoteApp.log.app.ServiceB- Retrying Socket... at line 6087 in file
     │ ZSocket.c
     │ 20200302 18:38:19.720 INFO   remoteApp.log.app.ServiceC- DeviceRegister_Database_Create() in file
     │ AthDB.c
     │ 20200302 18:38:20.120 INFO   remoteApp.log.app.ServiceC- Record Created at 0x7243874
     │ 20200302 18:38:20.210 DEBUG  remoteApp.log.app.ServiceA- (12386) dropbear_login_auth INIT
     │ 20200302 18:38:20.520 INFO   remoteApp.log.app.ServiceD- Record Posted at line 609 in file
     │ BlastPost.c
     │ 20200302 18:38:21.220 DEBUG  remoteApp.log.app.ServiceC- Device Registration Complete
     │ 20200302 18:38:21.520 INFO   remoteApp.log.app.ServiceB- Device Profile Acquired
     │ 20200302 18:38:13.520 DEBUG  remoteApp.log.app.ServiceA- (12386) dropbear_login_auth SUCCESS
     │ 20200302 18:38:23.320 DEBUG  remoteApp.log.app.ServiceA- Callback Registration Complete
                                                                       └─822
```

FIG. 8

```
{
 "mimeType": "application/json; charset=UTF-8",         "text":
"{\"request\":\"saveInstance\",\"server\":\"P8Local\",\"serverName\":\"FileNet/Engine\",\"desktopId
\":\"default\",\"data\":{\"type\":\"ObjectValue\",\"classId\":\"Test\",\"objectId\":\"{C0BF0171-0000-
C01F-B005-EA1AC236EC42}\",\"objectStore\":\"{93980B71-F44C-46ED-B1EB-
4E5F4A5650C7}\",\"superClasses\":\"Document\",\"properties\":[{\"CompoundDocumentState\":{\"type\":\"
SingletonInteger32\",\"value\":\"0\"}}],\"pendingActions\":[{\"type\":\"CreateAction\",\"params\":{\"
classId\":\"Test\",\"objectId\":\"{C0BF0171-0000-C01F-B005-EA1AC236EC42}\"}}]}"
```

```
2020-03-22T18:18:10.437 92972DB0 ENG FNRCE0000D - DEBUG preCreate.Create, object is of supported
class, objectId={C0BF0171-0000-C01F-B005-EA1AC236EC42}
```

1402  1404                1428 p8_server_trace.log ← 1406

FIG. 14

```
{
  foundintestcasemap: true
  foundedvalueintestcasemap: {COBF0171-0000-C01F-B005-EA1AC236EC42},
  foundacrossproductcomponents:true,
  foundacrosscollections: false,
  distinct_component_collections:[
  { product_component: p8
    collection_id: 92972DB0
  },
  ], logging_locations:{
  [{
    product_component: p8,
    logging_filename: p8_server_trace.log,
    line_number: 1768
    collection_id: 92972DB0
    request_user_name:
  },{
    product_component: p8,
    logging_filename: p8_server_trace.log,
    line_number: 1776
    collection_id: 92972DB0
    request_user_name:
  },
```

FIG. 15

COMPUTER SYSTEM DIAGNOSTIC LOG CHAIN

FIELD

The present invention relates to computer system diagnostics and, more particularly, to a computer system diagnostic log chain.

BACKGROUND

Modern computing systems and applications generate vast amounts of data resulting from the operation of those computing systems and applications. In some cases, hundreds of megabytes of diagnostic output, in the form of various log files, may be generated. These vast amounts of data are stored in designated locations, such as log files/records, which can then be reviewed at a later time period in the event of an error or anomaly in the operation of the system or application.

Enterprise and cloud-based systems are examples of large-scale systems that include a large set of components and software. As technology continues to advance, these computing systems become increasingly complicated in their internal structure and in their interconnections with other computing systems. Such systems can have multiple components that rely on other components for information and/or access to resources. As a result, a failure in any component of the computer system can impact other connected components. Furthermore, such systems often demand high availability, with minimum interruption and downtime to repair problems.

Although computer systems typically collect logs that can help with diagnosis, any given computer system may generate a tremendous number of logs, including normal records and event records that correspond to component failures. It can often be quite difficult to retrieve the correct failure signature from the logs to diagnose failures within large-scale systems.

SUMMARY

In one embodiment, there is provided a computer-implemented method for log processing, comprising: obtaining test case logs for a test case; identifying a marker in the test case logs; performing a log trimming operation on the test case logs based on the identified marker; and creating a log chain, wherein the log chain comprises contents of a subset of the plurality of the test case logs in chronological order.

In another embodiment, there is provided an electronic computation device comprising: a processor; a memory coupled to the processor, the memory containing instructions, that when executed by the processor, cause the electronic computation device to: obtain test case logs for a test case; identify a marker in the test case logs; perform a log trimming operation on the test case logs based on the identified marker; and create a log chain, wherein the log chain comprises contents of a subset of the plurality of the test case logs in chronological order.

In yet another embodiment, there is provided a computer program product for an electronic computation device comprising a computer readable storage medium having program instructions embodied therewith, the program instructions executable by a processor to cause the electronic computation device to: obtain test case logs for a test case; identify a marker in the test case logs; perform a log trimming operation on the test case logs based on the identified marker; and create a log chain, wherein the log chain comprises contents of a subset of the plurality of the test case logs in chronological order.

BRIEF DESCRIPTION OF THE DRAWINGS

Features of the disclosed embodiments will be more readily understood from the following detailed description of the various aspects of the invention taken in conjunction with the accompanying drawings.

FIG. 5 shows an example of a log chain containing multiple components.

FIG. 6 shows an example of a log chain containing multiple components that includes a marker.

FIG. 7 shows an example of a neighbor mode log chain.

FIG. 8 shows an example of a log chain with multiple components and multiple threads.

FIG. 13 shows an example HAR file excerpt.

FIG. 14 shows an example raw log file excerpt.

FIG. 15 shows an excerpt of an exemplary logmsgtoken hashmap in accordance with disclosed embodiments.

Figure 1:
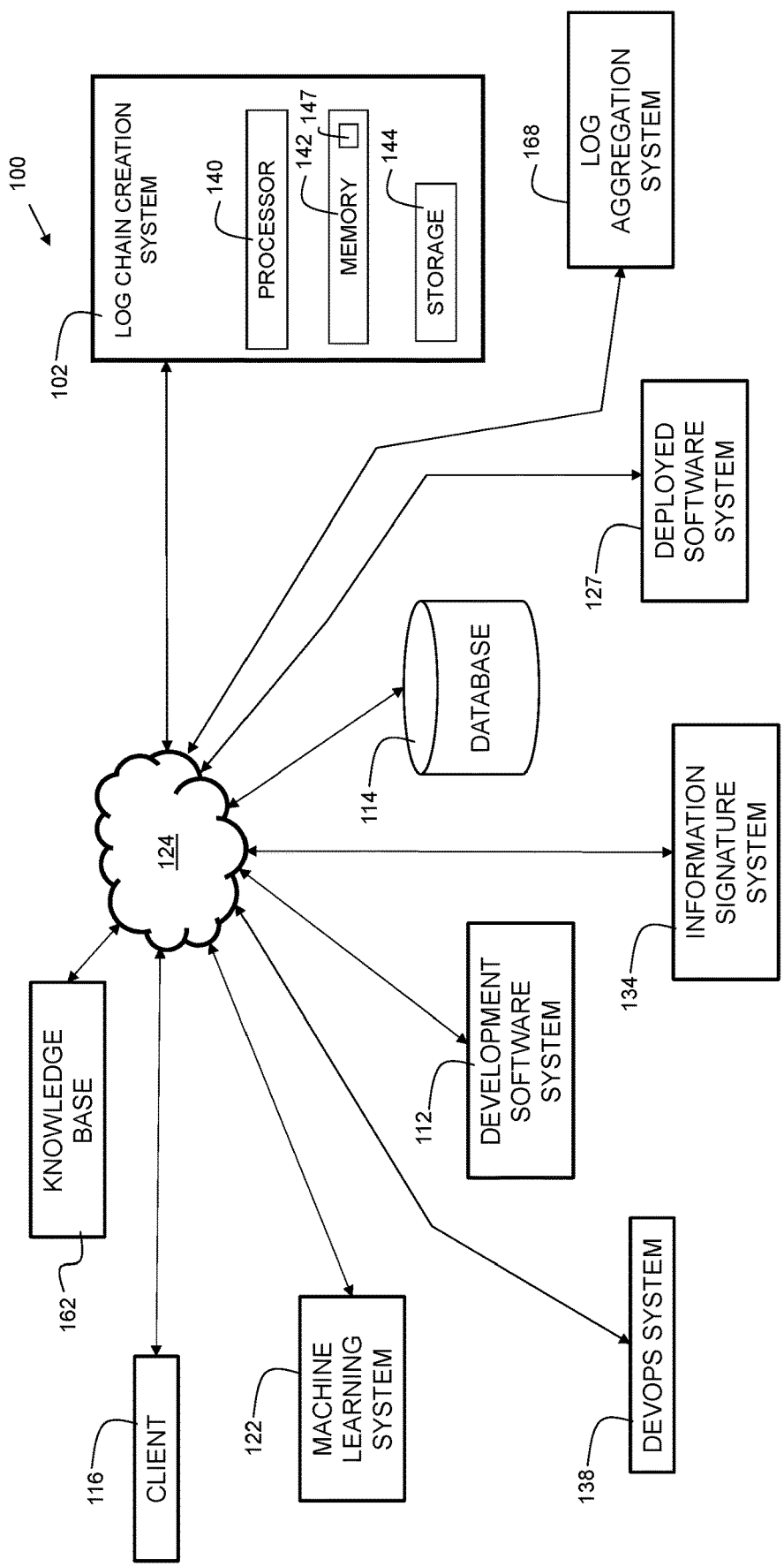
FIG. 1 is an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide a computer-implemented technique for creating a log chain from multiple software component logs. The log chain can include log information from multiple software components that interact with each other. In embodiments, a locality-sensitive hashing technique is used to create a signature of a log chain. Machine-learning systems are trained with log chains generated from test execution, and/or log chains from incidents with deployed software. In embodiments, logs are pre-processed by tokenizing and trimming. Logs from various components that interact with each other may be combined into a temporally sequential log chain. The signature of the log chain may be used to identify additional information about the error from a machine-learning process that was trained on previously generated log chains. In this way, the time required to identify a problem can be significantly reduced, resulting in increased reliability and availability of complex computer systems.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

FIG. 1 shows an environment 100 for embodiments of the present invention. Log chain creation system 102 comprises a processor 140, a memory 142 coupled to the processor 140, and storage 144. System 102 is an electronic computation device. The memory 142 contains instructions 147, that when executed by the processor 140, perform processes, techniques, and implementations of disclosed embodiments.

Memory 142 may include dynamic random-access memory (DRAM), static random-access memory (SRAM), magnetic storage, and/or a read only memory such as flash, EEPROM, optical storage, or other suitable memory. In some embodiments, the memory 142 may not be a transitory signal per se. In some embodiments, storage 144 may include one or more magnetic storage devices such as hard disk drives (HDDs). Storage 144 may additionally include one or more solid state drives (SSDs). The log chain creation system 102 is configured to interact with other elements of environment 100 in order to create log chains. A log chain can include a trimmed output. A trimmed output may include a temporal section of multiple logs that are combined. In some embodiments, logs can be in the form of "streams" which include information written to a device, such as a console, file descriptor, pipe, or other abstraction. In some embodiments, the logs can be in the form of physical files. The physical files may in some embodiments be stored locally on a device under test (DUT), and/or periodically uploaded to a networked log server or other suitable storage device. The log chain may include multiple logs combined in a temporal manner, forming a single log that includes lines of text from multiple logs, sorted in chronological order. Thus, in embodiments, the log chain comprises contents of a subset of the plurality of test case logs in chronological order. This enables engineers, technicians, and other stakeholders to quickly assess and diagnose issues and determine the operational state of a complex computer system. System 102 is connected to network 124, which is the Internet, a wide area network, a local area network, or other suitable network.

DevOps system 138 is part of the environment 100. This system can include a continuous integration system such as Jenkins or other suitable tool, a defect tracking system such as Bugzilla, Jira or other suitable tool, a code collaboration tool such as Gerrit, and/or a code distribution tool to push upgrades to test environments such as development software system 112, as well as deployed environments such as deployed software system 127.

Log aggregation system 168 collects logs from devices executing test and/or deployed software. The log aggregation system 168 may store logs as well as perform some processing functions on the logs. The computing devices within each test and/or deployment environment generate log files. Log files are typically text-based files that contain information about the operation of the device. Warnings, errors, and other unexpected conditions are typically written to one or more log files. The computing devices within the deployments then typically upload the log files to the log aggregation system 168 on a regular basis. On the log aggregation system 168, certain text strings and/or patterns, referred to as "markers", are identified as indicative of an error or other problem warranting investigation. The information in the log file associated with the marker is further parsed to obtain additional information about the error or incident. The log aggregation system 168 may include or interface with log processing tools such as Splunk, Loggly, or other suitable tools. The log chain creation system 102 may interact with logs that have been pre-processed by the log aggregation system 168 in order to improve efficiency in the creation of log chains.

Information signature system 134 is part of the environment 100. This system performs a locality-sensitive hashing technique on log chains. In general, a locality-sensitive hashing technique can be employed to find documents that are similar, but not necessarily identical to each other. The information signature system 134 may include one or more computers operating to perform locality-sensitive hashing on log chains to generate corresponding information signatures. Thus, each log chain has a corresponding information signature. Thus, embodiments can include computing an information signature of the log chain using a locality-sensitive hashing technique. In embodiments, the locality-sensitive hashing technique comprises a Sim Hash process. In embodiments, the locality-sensitive hashing technique comprises a SimHash process.

In embodiments, the log chains are tokenized, and various combinations of tokens are used to generate the information signature. In some embodiments, certain tokens may be discarded prior to generation of the information signature. For example, most logs contain timestamps, which will differ for each incident. By tokenizing the timestamps and removing them prior to performing the locality-sensitive hashing technique, the effectiveness of identifying similar log chains can be improved. In some embodiments, a metric is used to assess the similarity of a log chain in a deployed environment to a log chain previously generated in a test environment. By doing this, an issue that occurs in a deployed environment can be quickly correlated to a previously encountered issue. This can help speed resolution of the issue by identifying the cause, as well as potentially related software fixes that may already exist for the problem encountered in the deployed environment. In some embodiments, the metric used is a Jaccard Index.

Machine learning system 122 is part of the environment 100. In embodiments, the machine learning system 122 is configured to perform classification and/or pattern recognition on a log chain in order to identify similar log chains that have been previously collected. This is particularly valuable in the case of identifying a log chain collected during a test. To illustrate, consider a scenario in which an error (software defect) occurs in a deployed system, affecting customers of that system. In disclosed embodiments, a log chain is obtained, and then analyzed with machine learning, and a similar log chain from a test case is identified. Once the test case is identified, it can be determined if a fix and/or workaround already exists, based on the test case. If so, the workaround and/or fix can be identified and implemented to reduce the downtime and/or loss of productivity due to the defect. This can be especially useful because often, in software development, deployed software lags behind software under test in terms of features and/or software defect resolutions. With disclosed embodiments, instances of issues occurring in deployed systems that already have a workaround and/or fix can be quickly identified.

The machine learning system 122 may include one or more computers operating to perform log chain classification. The machine learning system 122 may include a neural network, convolutional neural network (CNN), Decision Trees, Random Forests, clustering, hierarchical clustering, k-means, and/or any other supervised learning techniques, unsupervised learning techniques, or a combination of both supervised and unsupervised learning techniques. In embodiments, TensorFlow or other suitable frameworks may be used in the implementation of machine learning system 122.

Database 114 is part of the environment 100. The database 114 may be configured to store log chains, as well as metadata associated with the log chains. The metadata can include details about test cases associated with the log chains, defect tickets associated with the log chains, and/or other relevant information. In some embodiments, the database may include a structured query language (SQL) database such as MySQL.

Deployed software system 127 is part of the environment 100. The deployed software system 127 may be a production system or other "live" system used by customers.

Development software system 112 is part of the environment 100. This system may be used as a testing environment for a software product and/or service. In some embodiments, as part of a DevOps pipeline process, software is tested on the development software system 112. In a general DevOps process, software is thoroughly tested on the development software system 112 before being deployed to deployed software system 127. When the software is deemed to work satisfactorily (e.g., passing a certain number and/or percentage of test cases), it may then be pushed to the deployed software system 127.

Client device 116 is part of the environment 100. The client device 116 is an electronic computing device. The client device 116 is used to interact with the log chain creation system 102, in order to perform functions of disclosed embodiments. In embodiments, the client device 116 can be a desktop computer, laptop computer, tablet computer, or other suitable device.

Knowledge base 162 is part of the environment 100. This system may contain additional knowledge and/or information regarding the deployed software. The information can include symptoms, workarounds, known issues, defect ticket numbers, software version information, configuration recommendations, and other technical advice. In some embodiments, the log chain creation system 102 may interface with database 114 and/or knowledge base 162 to compile additional information that may be relevant to a log chain. In some embodiments, a correlation report may be generated for a log chain, in which the correlation report may include information retrieved from the knowledge base 162.

Figure 2:
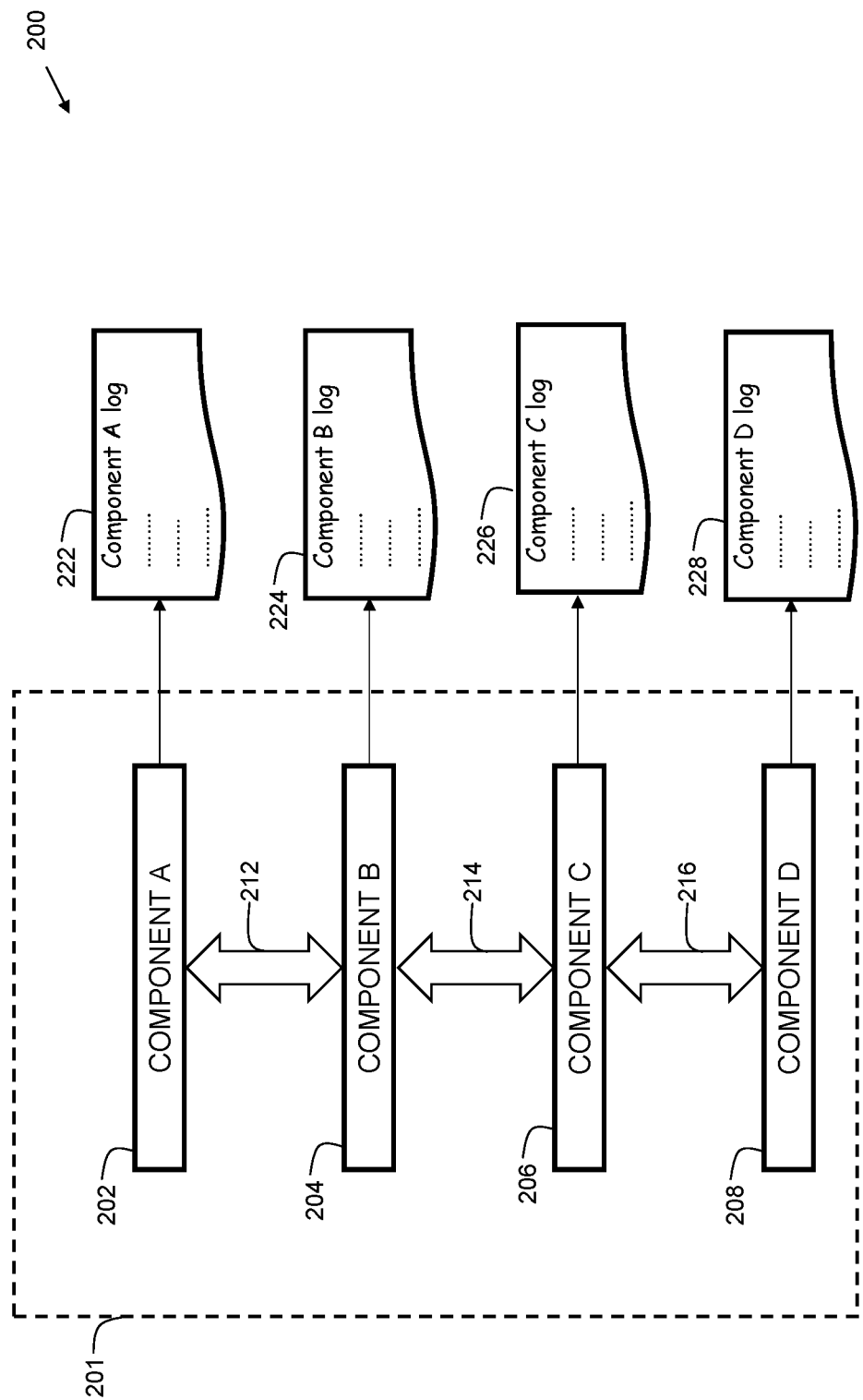
FIG. 2 is an example of software component interaction.

FIG. 2 is an example 200 of software component interaction. A software package 201 includes multiple components. Component A (202) interfaces with Component B (204) via interface 212. Component B (204) interfaces with Component C (206) via interface 214. Component C (206) interfaces with Component D (208) via interface 216. Interfaces 212, 214 and 216 may be physical interfaces or logical interfaces. The interfaces may be implemented with an interprocess communication protocol such as Dbus, remote procedure calls (RPC), HTTP Get/Post calls, SOAP, RESTful APIs, or other suitable protocol. In the example 200, component A calls Component B. Component B calls Component C, and Component C calls component D. Component D may pass some result and/or status back up the list of components, making its way back to Component A.

In the example 200, each component generates a log. In practice, a component may generate more than one log. In the example 200, component A creates log 222, component B creates log 224, component C creates log 226, and component D creates log 228. These logs may be saved to a storage device on the platform that the deployed software is operating, or they may be streamed to log aggregation system 168 for storage there. In embodiments, the log chain may combine logs from the different log files in a temporally sorted manner to form the log chain, such that the log chain contains the events of all the components in chronological order. This can greatly simplify the effort of diagnosing complex interactions between multiple components. Note that while four components are shown in FIG. 2, in practice there can be more or fewer components. In some embodiments, the number of components is at least three and less than 200 components. In some embodiments, the number of components may range between 200 and 300 components. In practice, there is no specific limit to the number of components that may be included. Primarily, the number of components is a function of the software that is being diagnosed.

Figure 3:
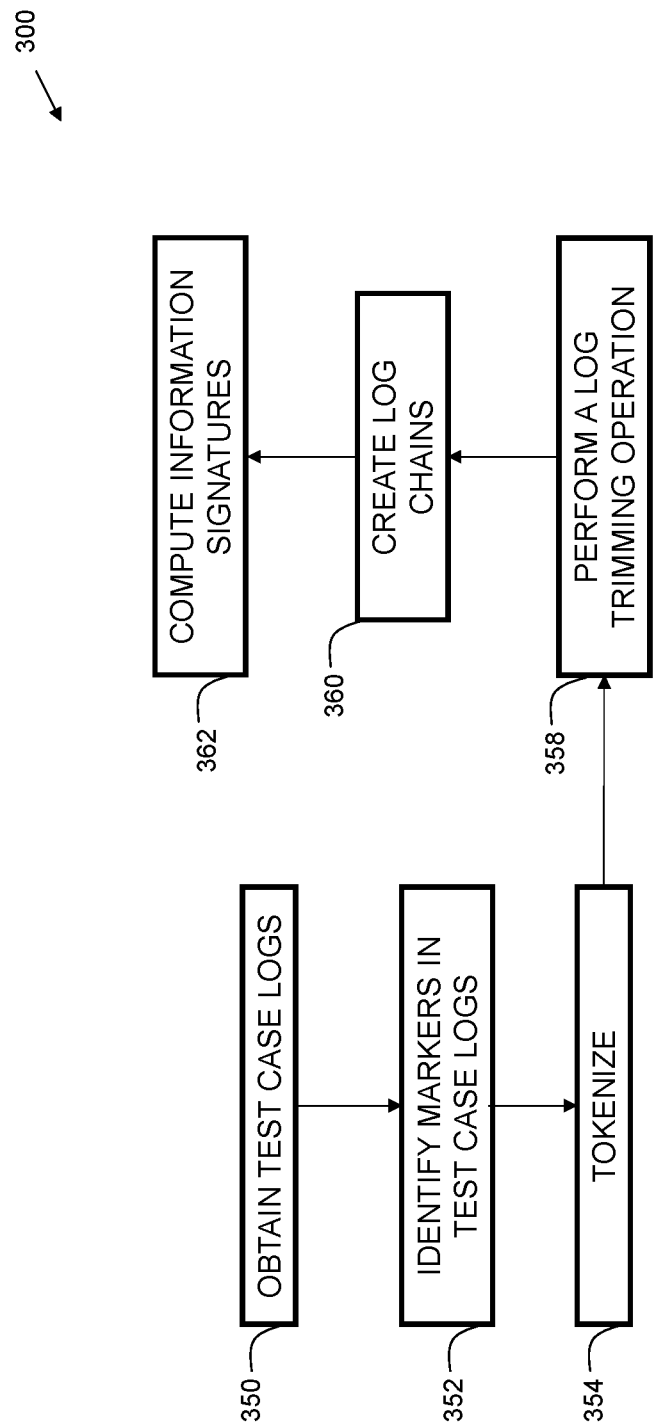
FIG. 3 is a flowchart indicating a process for disclosed embodiments.

FIG. 3 is a flowchart 300 indicating a process for disclosed embodiments. At 350, test case logs are obtained. In some embodiments, these logs may be obtained from software executing on development software system 112. At 352, markers are identified. The markers may include certain text strings and/or patterns that are indicative of a software defect or anomaly. At 354, a tokenization process is performed on lines of text within the log files. The tokenization allows different parts of each line of the log files to be processed independently of the other tokens. At 358, a log trimming operation is performed. In embodiments, the log trimming may be based on one or more markers identified at 352. A first marker can be used to indicate the start of a software process for which diagnostics is desired. A second marker can be used to indicate the end of a software process for which diagnostics is desired. As part of the trimming process, log lines from before the first marker can be discarded. Similarly, log lines from after the second marker can be discarded. In this way, the log chain captures relevant log lines, while discarding irrelevant lines, thus providing a clear rendering of information for support engineers. Once the logs are trimmed, the logs are combined into a single file or output, referred to as a log chain at 360. At 362, information signatures are computed for each log chain. This may include use of a using a locality-sensitive hashing technique. In some embodiments, prior to performing a locality-sensitive hashing technique, certain tokens, such as timestamps, memory locations, IP addresses, and/or MAC addresses may be discarded, in order to further improve the effectiveness of the locality-sensitive hashing technique. Since timestamps, memory locations, IP addresses, and/or MAC addresses are often unique for a particular test setup or test run, they can potentially cause divergence in the signatures, making comparison between log chains appear less similar than they really are. Disclosed embodiments can mitigate this problem by discarding those tokens prior to performing the locality-sensitive hashing technique. Note that while flowchart 300 shows a particular order, in some embodiments, the order of some of the procedures may be performed concurrently, or in a different order.

Figure 4:
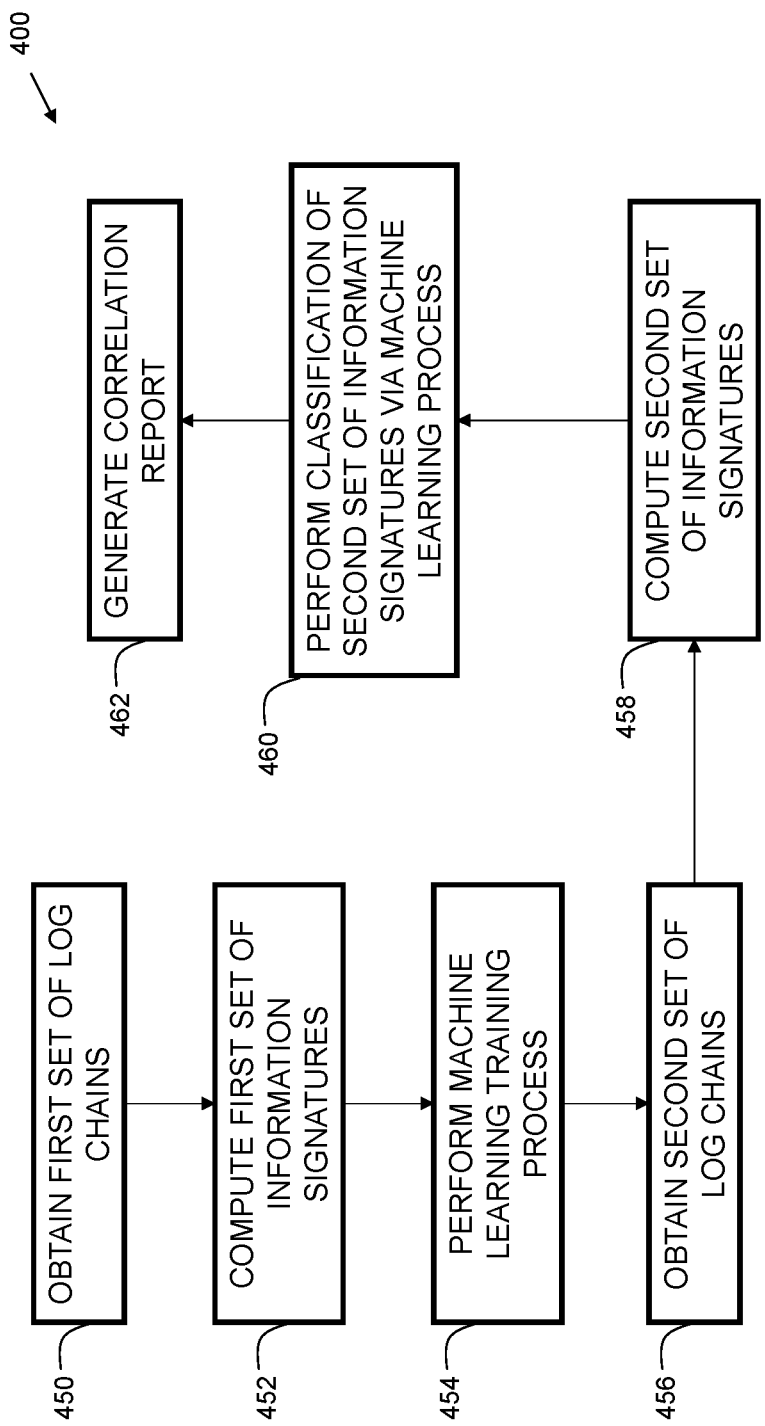
FIG. 4 is a flowchart indicating an additional process for disclosed embodiments.

FIG. 4 is a flowchart 400 indicating an additional process for disclosed embodiments. This shows the process for utilizing a machine-learning process to process log chains from a deployed system, and correlate those to log chains from test cases. At 450, a first set of log chains is obtained. In embodiments, the first set of log chains includes log chains derived from test cases. At 452, a first set of information signatures is computed. This may include performing a locality-sensitive hashing technique (e.g., using information signature system 134). At 454, a machine-learning training process is performed using the first set of information signatures. Once the machine-learning models are trained, the system is ready to be used to aid in diagnosing software anomalies in deployed software. A second set of log chains is obtained at 456. In embodiments, the second set of log chains includes log chains derived from deployed software, for which it is desired to identify and/or analyze anomalies. At 458, information signatures are obtained for each log chain of the second set of log chains. At 460, the machine-learning system (e.g., 122) that was trained at 454, is used to classify/categorize the second set of log chains. At 462, a correlation report is generated, indicating test cases corresponding to the first set of log chains that are determined to be similar to the second set of log chains. In this way, engineers and technical support personnel can quickly assess various complex issues that previously would have taken much longer to analyze and understand. Thus, with disclosed embodiments, improved uptime and availability of complex computer systems can be achieved. Note that while flowchart 400 shows a particular order, in some embodiments, the order of some of the procedures may be performed concurrently, or in a different order.

FIG. 5 shows an example of a log chain 500 containing multiple components. Column 502 is a timestamp. For example, in line 510, the timestamp is "20200302 18:38: 13.520" which indicates a date of Mar. 2, 2020, at a time of 18:38:13.520. In some embodiments, the time may be represented in UTC time. In other embodiments, the time may be represented in a local time zone. Column 504 represents a logging level. For example, in line 510, the logging level is DEBUG. In embodiments, there are multiple possible logging levels. Typically, the logging levels may reflect different levels of severity/importance of a particular log statement(line). In some embodiments, a log level of FATAL is used to output severe errors that cause premature termination of a software application. A log level of ERROR is used for output of runtime errors or unexpected conditions. A log level of WARN is used for warnings. The warnings can include programming errors such as incorrect use of API functions, and/or other runtime situations that are undesirable. A log level of INFO is used for informational events that are typically expected as part of normal software operation. A log level of DEBUG can include detailed information about system operation. A log level of TRACE can include the most detailed information. This information can be verbose and include hex dumps of data packets and other message details. These logging levels may be implemented by a logging library that is included in the software application, such as log 4j, log 4c, or other suitable logging library or utility.

The order of the logging levels, going from most severe to least severe may be arranged as FATAL, ERROR, WARN, INFO, DEBUG, and TRACE. During normal operation of deployed software, a logging level may be set at an intermediate logging level such as WARN. When the logging level is set to WARN, any logging statements of level WARN or above are output to consoles and/or logs. In this example, logging statements of level WARN, ERROR, and FATAL, are output, while logging statements of level INFO, DEBUG, and TRACE, are suppressed.

In some situations, the logging level for test cases may be set to a more verbose level, such as DEBUG or TRACE, whereas logging levels for deployed software may be set to a less verbose level such as WARN. One possible reason for operating in this way is to reduce the amount of log data for a deployed system that often runs on a large scale (e.g., enterprise level systems). Another possible reason for operating this way is that during testing, it may be desirable to observe logging information at the DEBUG and/or TRACE level in order to verify proper operation of the software component. Once proper operation is confirmed, these logging levels may be suppressed in deployed software in order to make the software execute more efficiently, as in some cases, verbose logging can slow the execution of a software component, making it less efficient.

This difference in logging levels between test cases and deployed systems can cause increased differences in information signatures between test case log chains and deployed software log chains. In some embodiments, for test case log chains, a second information signature is computed by filtering out the log statements of levels that are filtered out in the deployed software. This enables a more effective similarity comparison. As an example, consider a scenario where a test case log chain includes DEBUG level logging, and a deployed software log chain is set to WARN, which excludes DEBUG level logging. The test case log chain may be filtered to remove DEBUG level logging prior to computing the second information signature. In this way, the comparison between the second information signature of the test case log chain, and that of the deployed software log chain, are more indicative of actual similarities.

Column 506 represents a component name. Referring to line 510, the component name is indicated as "remoteApp.log.app.ServiceA." The component name may include an application name, and one or more subsystem names concatenated and separated by a period or other punctuation mark. In this example, the portion "remoteApp" may refer to a name of an overall software application and/or service. The subsequent sections "log" and "app" may refer to additional subcomponents of execution. The final portion, "ServiceA" may refer to a functional software component interacting with other software components. In this example, "ServiceA" corresponds to 202 of FIG. 2.

Column 508 represents a logging statement. The logging statement represents information output by the component indicated at 506. Referring to line 510, the logging statement is "IoT_Detection_CallbackRegister Enter." Note that for display purposes, some lines may wrap to continue below the start of the line. For the purposes of this disclosure, each logging line starts with a timestamp. Thus, in the example, line 512 is the next logging line after 510, even though the word "Enter" is shown below the start of line 510, due to wrapping of text.

Line 512, also from "ServiceA," has a logging statement "IoT_DetectionCallbackInit at line 115 in file IoT_DetectCB.c." Thus, the logging statement for line 512 includes a file name 525 and a line number 523. In some embodiments, the file names and line numbers may be used as markers to indicate certain conditions and/or errors that occur during software execution. Referring to line 513, column 506, the component name is "remoteApp.log.app-.ServiceB" which, in this example, corresponds to 204 of FIG. 2. Referring to line 514, column 506, the component name is "remoteApp.log.app.ServiceC" which, in this example, corresponds to 206 of FIG. 2. The logging statement at column 508 for line 514 includes a memory location 527. In many software applications, memory is allocated dynamically. In such cases, memory addresses may differ on most every invocation of the software function. In some embodiments, the tokenizing process includes creating a token for memory addresses. The memory address token may be discarded prior to creating the information signature, in order to increase the accuracy of similarity comparisons between two different log chains. As an example, the logging statement for line 514 is "Record Created at 0x7243874." However, on a different execution instance of the same software function execution, the corresponding logging line could likely have a different memory location. For example, a different execution instance may produce a logging line such as "Record Created at 0x7AB0128." With disclosed embodiments, the tokenized memory location is discarded prior to generation of information signatures (e.g., via a locality-sensitive hashing technique) in order to improve similarity detection.

Referring to line 516, column 506, the component name is "remoteApp.log.app.ServiceD" which in this example, corresponds to 208 of FIG. 2. Thus, log chain 500 includes four components (ServiceA, ServiceB, ServiceC, and ServiceD). In embodiments, the log chain comprises logs from at least three components. In embodiments, the log chain includes at least three components and less than 200 components. In practice, the number of components is not limited to 200, and is based on the architecture of the deployed software, and the number of components it has.

The log chain 500 is an example of a "full journey" log chain. A full journey log chain shows an execution path from one component (in this example, ServiceA), calling/communicating to other components (ServiceB, ServiceC, and ServiceD), and then working back to the originating component. With regards to log chain 500, the originating component, shown at line 510, column 506 is ServiceA. At line 513, column 506, ServiceB is invoked. At line 542, column 506, ServiceC is invoked. At line 516, column 506, ServiceD is invoked. Then, the information and/or status propagates back to its originating component. Starting at line 544, column 506, ServiceC is again invoked. Starting at line 546, column 506, ServiceB is again invoked. Starting at line 548, column 506, ServiceA is again invoked. As can be seen in the logging statement at column 508 for line 510, the originating component A (ServiceA) started with registering a callback as indicated by "IoT_Detection_CallbackRegister Enter." The logging statement 508 for line 548 is also with the originating component A (ServiceA), which indicates "Callback Registration Complete." Thus, log chain 500 captures the full journey for the event of callback registration. A software support engineer can quickly view the full journey of components involved in registration of the callback. Note that a callback registration process is merely an example of a software interaction between multiple components. In practice, there are many various types of software execution patterns that may be included in a log chain.

FIG. 6 shows an example of a log chain 600 containing multiple components that includes a marker. Log chain 600 includes marker 622 in line 615. In embodiments, markers may be used to identify certain conditions. During software development, the markers are included in the software such that identifiable patterns are output to component logs under certain conditions. These identifiable patterns are referred to as markers. In the example log chain 600, the marker 622 is the string "LogMarker." However, in practice, the markers can include more complex strings, and may be comprised of multiple tokens created during a tokenization process. In some embodiments, the markers may be used to determine the start and/or end of a software execution sequence that is desired to be captured in a log chain. Thus, in embodiments, the markers may be used to determine trim points for trimming operations of component logs prior to combining them into a log chain.

Log chain 600 includes a similar software execution sequence as log chain 500 of FIG. 5, with the main difference being that the log chain 500 of FIG. 5 represents a successful invocation, whereas the log chain 600 represents an error case. At line 612, column 508 there is a log statement indicating an error: "error→Uninitialized Memory Array at line 976 in file AthDB.c." The previous line, line 642, is similar to line 542 of FIG. 5. After this point, the log chain 600 diverges from log chain 500 of FIG. 4. Line 614 includes a FATAL logging statement for ServiceC (column 506). Line 644 includes a FATAL logging statement for ServiceB (column 506). Line 615 includes a FATAL logging statement for ServiceA (column 506). The final line 616 has a logging statement 508 indicating "Callback Registration Failed." As can be seen in log chain 600, component D (ServiceD) did not get invoked (as compared with line 516 of FIG. 5). Upon observing this, a software support engineer may decide to obtain a neighbor mode log chain. A neighbor mode log chain shows interaction between two adjacent components, filtering out other components. In this way, a great deal of unrelated information is not displayed, allowing personnel to focus on the most relevant logging statements, allowing quick and efficient debugging of the issue.

FIG. 7 shows an example of a neighbor mode log chain 700. As can be seen in log chain 700, column 506, only logging statements from component B (ServiceB) and component C (ServiceC) are shown. Thus, this log chain only shows interaction between two neighboring components (e.g., 204 and 206 of FIG. 2). The neighbor mode feature of disclosed embodiments allows engineers and support personnel to focus on a particular area of a software system when it is suspected that the particular area is where the problem lies. Thus, in embodiments, the log chain comprises logs from two adjacent components. In some embodiments, the log chain consists only of logs from two adjacent components.

FIG. 8 shows an example of a log chain 800 with multiple components and multiple threads. Log chain 800 is similar to log chain 500 of FIG. 5 in that it includes logging lines from multiple components. However, this example includes a multi-threaded software component. Note, for the purposes of this disclosure, the term "thread" and "process" are used interchangeably. While there can be underlying differences between processes and threads in terms of memory space allocation, and context switching procedures, for the purposes of logging, both threads and processes represent different instances of similar execution.

Referring again to log chain 800, line 802 has thread identifier 822 which is "8726" and line 804 has thread identifier 824 which is "10852." In most cases, the thread identifiers may be different on different instances of execution. Referring to line 806, the logging statement in column 508 indicates "(8726) dropbear_login_auth SUCCESS," which indicates that the execution starting at line 802, with the same thread identifier "8726" is successful.

In the example log chain 800, starting at line 804, an instance of execution similar to that of line 802 is started, but with a different thread identifier "10852" as indicated at 824. As can be seen in lines 808 and 810, error messages occur at column 508 for those lines. In these situations, it can be desirable to create a thread-specific log chain to allow the support engineer to focus on a problematic area of the software execution.

Figure 9:
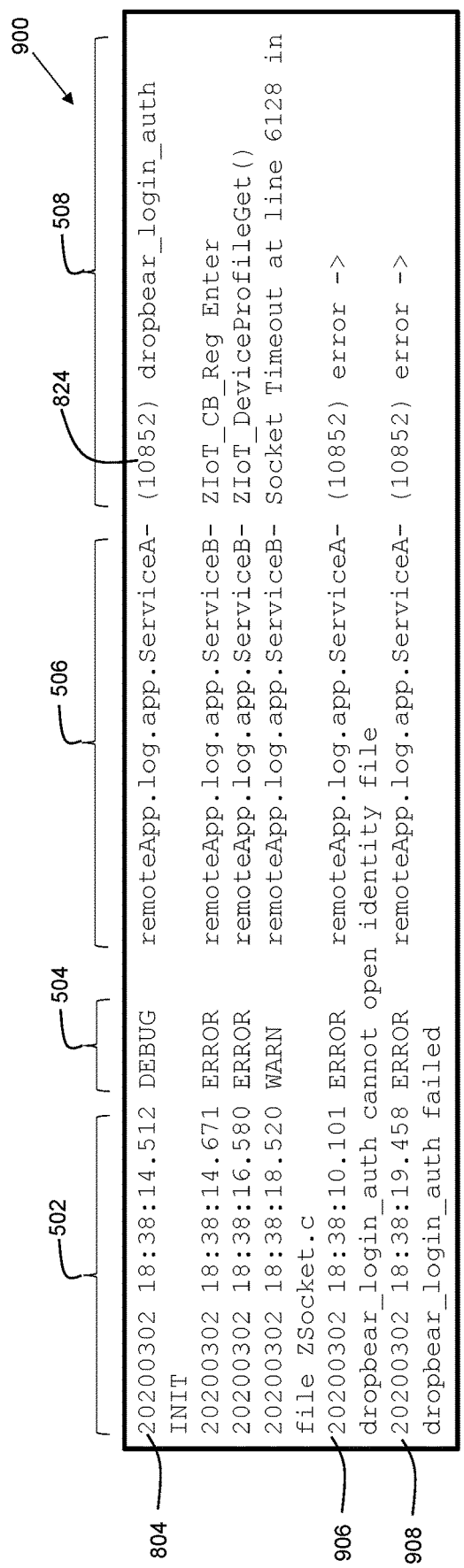
FIG. 9 shows an example of a log chain with multiple components that is filtered by thread.

FIG. 9 shows an example of a log chain 900 with multiple components that is filtered by thread. Log chain 900 includes a subset of the logging lines included in log chain 800 of FIG. 8. For the multi-threaded component (component A/ServiceA), the log chain only shows lines for the thread indicated by thread identifier 824, since thread "10852" encountered an error during execution (e.g., indicated at 906 and 908). The other threads shown in FIG. 8 (thread "8726" and thread "12386") did not encounter errors during execution, and thus are not shown in log chain 900. Thus, embodiments can include filtering the log chain based on a thread identifier.

Figure 10:
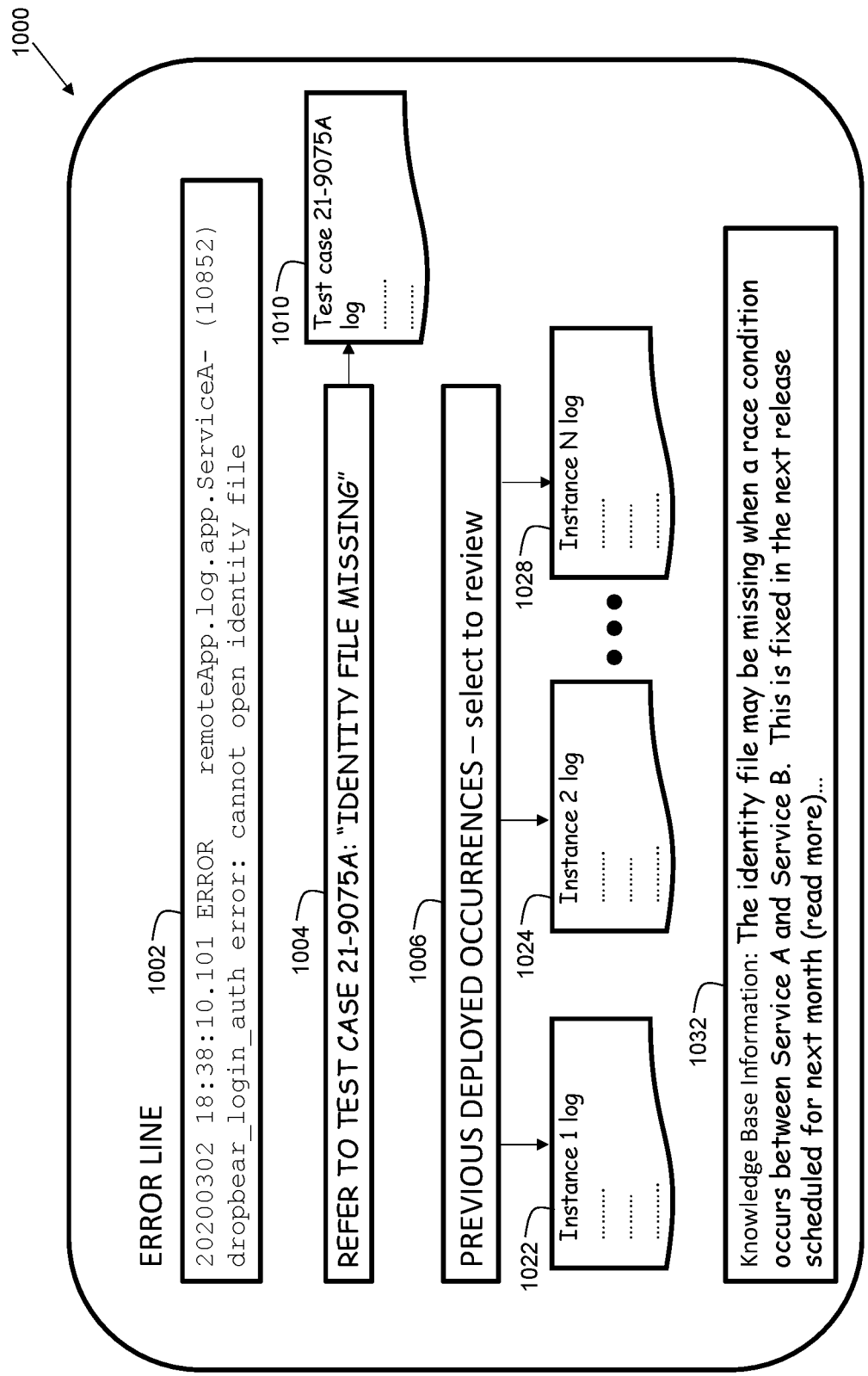
FIG. 10 shows an example of a correlation report in accordance with disclosed embodiments.

FIG. 10 shows an example of a correlation report 1000 in accordance with disclosed embodiments. The correlation report 1000 can include information based on a correlation between two log chains based on a similarity between information signatures, and/or classification from machine learning system 122. At 1002, a logging line is shown that is indicative of a software error or anomaly. At 1004, a test case that is associated with a correlated log chain is displayed. This gives the support engineers and other stakeholders a quick and efficient identification of a related test case and/or known problem. At 1010, a link to the test case log is shown. In embodiments, selecting link (or icon) 1010 opens the related test log chain to enable further review of the related test cases. The correlation report 1000 may further include one or more previous occurrences at 1006. As shown in the example correlation report 1000, there are three instances shown. At 1022, there is a link/icon for a log chain pertaining to instance 1. At 1024, there is a link/icon for a log chain pertaining to instance 2. At 1028, there is a link/icon for a log chain pertaining to instance N. While three log chains for previous deployed occurrences are shown in FIG. 10, in practice there can be more or fewer log chains. The previous deployed occurrences may be identified based on a similar information signature. The previous deployed occurrences can be useful for support engineers to determine if the error/anomaly under investigation has been previously occurring in deployed environments, and under what circumstances. Correlation report 1000 may further include knowledge base information field 1032. The knowledge base information field 1032 can include information retrieved from knowledge base 162. This information can include, but is not limited to, root cause information, workaround information, software defect ticket information, fix release schedules, software branches and/or versions containing the fix, and/or other relevant information. The correlation report is an output that transforms data such as information signatures of log chains into information in a human-readable format that allows for efficient diagnosis of complex software systems.

Embodiments can include obtaining a first set of log chains; computing a first set of information signatures using a locality-sensitive hashing technique; performing a supervised machine learning process using a plurality of information signatures corresponding to a first set of log chains; obtaining a second set of log chains; computing a second set of information signatures using a locality-sensitive hashing technique; performing a computerized classification of the second set of log chains via a machine learning process; and generating a correlation report, wherein the correlation report includes one or more log chains from the first set of log chains, and one or more log chains from the second set of log chains, and an indication of a correlation between the one or more log chains from the first set of log chains, and the one or more log chains from the second set of log chains.

Figure 11:
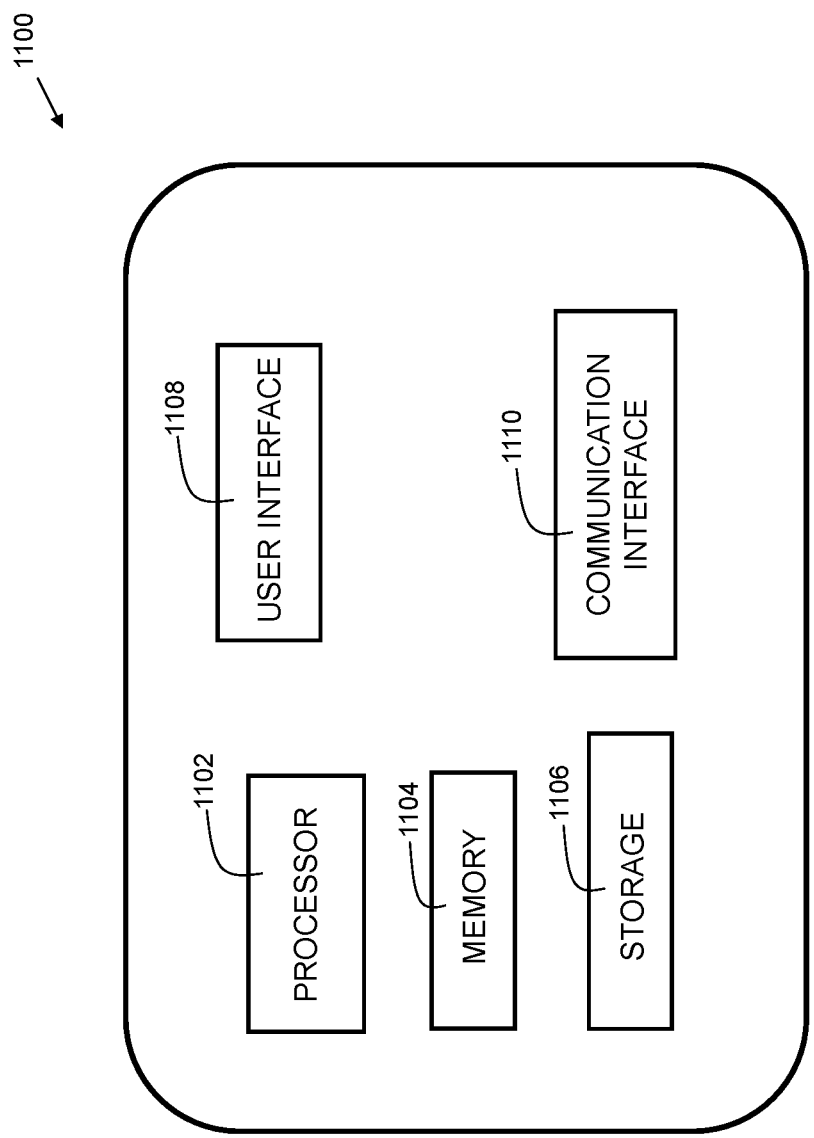
FIG. 11 is a block diagram of a client device used in accordance with disclosed embodiments.

FIG. 11 shows a block diagram of a client device 1100 in accordance with disclosed embodiments. In embodiments, this may represent a mobile electronic device such as 116 of FIG. 1. Device 1100 includes a processor 1102, which is coupled to a memory 1104. Memory 1104 may include dynamic random-access memory (DRAM), static random-access memory (SRAM), magnetic storage, and/or a read only memory such as flash, EEPROM, optical storage, or other suitable memory. In some embodiments, the memory 1104 may not be a transitory signal per se.

Device 1100 may further include storage 1106. In embodiments, storage 1106 may include one or more magnetic storage devices such as hard disk drives (HDDs). Storage 1106 may additionally include one or more solid state drives (SSDs).

Device 1100 may, in some embodiments, include a user interface 1108. This may include a display, keyboard, or other suitable interface. In some embodiments, the display may be touch-sensitive.

The device 1100 further includes a communication interface 1110. The communication interface 1110 may include a wireless communication interface that includes modulators, demodulators, and antennas for a variety of wireless protocols including, but not limited to, Bluetooth™, Wi-Fi, and/or cellular communication protocols for communication over a computer network. In embodiments, instructions are stored in memory 1104. The instructions, when executed by the processor 1102, cause the electronic computing device 1100 to execute operations in accordance with disclosed embodiments. These operations can include initiating tests, requesting log chains, setting log chain options such as full journey mode or neighbor mode, and/or requesting correlation reports from log chain creation system 102.

Figure 12:
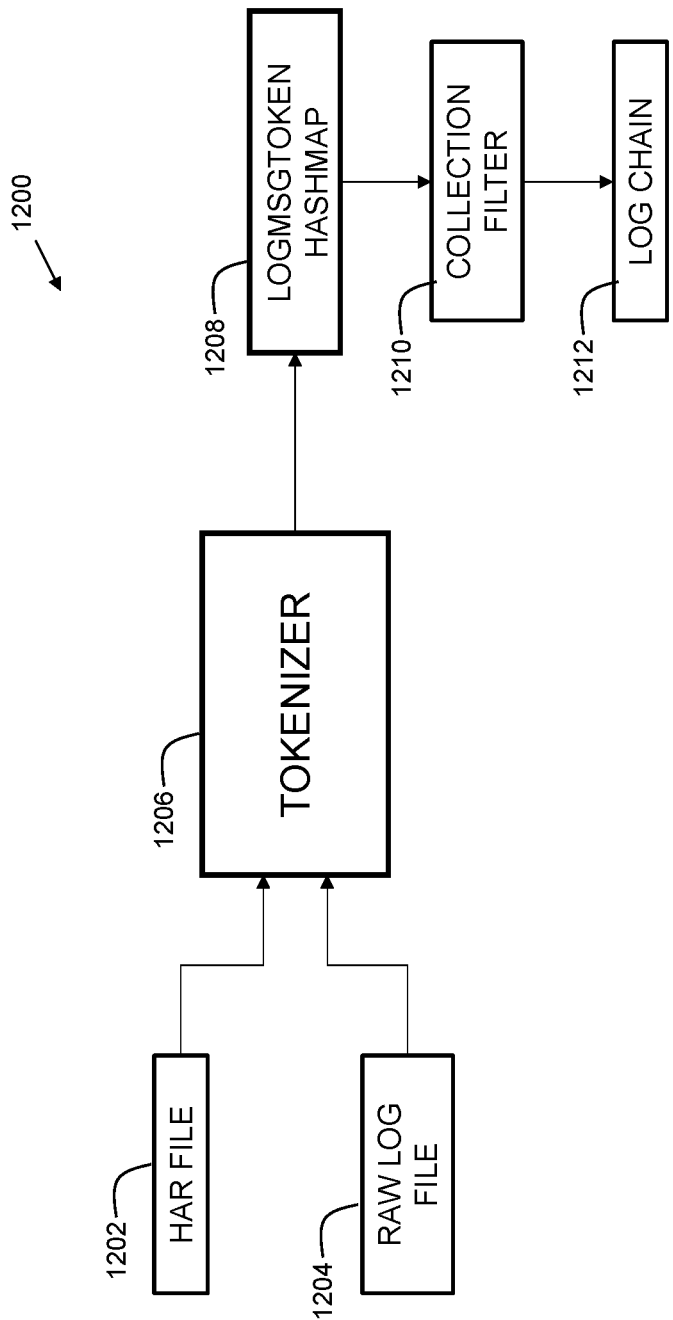
FIG. 12 is a flow diagram showing creation of a log chain in accordance with additional embodiments.

FIG. 12 is a flow diagram 1200 showing creation of a log chain in accordance with additional embodiments. In some embodiments, a HAR file 1202 along with a corresponding raw log file 1204 are provided to a tokenizer 1206. A HAR (HTTP Archive) file is a format used for tracking information between a web browser and a website. A HAR file is primarily used for identifying performance issues, such as bottlenecks and slow load times, and page rendering problems. The HAR file keeps track of resources loaded by the browser along with timing information for those resources. When troubleshooting complex issues, it is sometimes desirable to collect a HAR file. Then, disclosed embodiments process the HAR file along with the corresponding raw log file as shown in diagram 1200 of FIG. 12.

The tokenizer 1206 may tokenize the HAR file and/or log file into various tokens. In many cases, the format of the raw log files is known a priori as they are generated by a standardized logging library such as log 4j, log 4c, or the like. These logging libraries have formatters that can be used and/or customized to generate log messages in a known format. As an example, a log file such as raw log file 1204 may be generated to have a timestamp, followed by a collection identifier, followed by a severity level, followed by a logging statement. In this instance, the first token in a log line obtained by tokenizer 1206 corresponds to a time stamp, the second token corresponds to the collection identifier, and so on. The output of the tokenizer 1206 is used to create a logmsgtoken hashmap 1208 in accordance with disclosed embodiments. The logmsgtoken hashmap 1208 can be of the format {Key→Value}, and can include various metadata about the logging, including, but not limited to, a product component name, a logging filename, a line number, a collection identifier, and an object identifier. In embodiments, data from the logmsgtoken hashmap 1208 is applied with a collection filter 1210 to create a log chain 1212 corresponding to a particular collection identifier. A collection identifier can be a thread identifier for a particular thread, a process identifier for a particular process, a MAC address or IP address corresponding to a particular machine, and/or other suitable identifying criteria. In this way, results from test cases can be easily converted to corresponding log chains. In this environment, HAR files may be generated for each test case from a corresponding browser application used for conducting tests of the software system undergoing evaluation. In embodiments, some or all of the elements shown in FIG. 12 may be performed by log chain creation system 102.

FIG. 13 shows an example HAR file excerpt 1300. The HAR file can include various pieces of important information for system evaluation and troubleshooting. This information can include, but is not limited to, the time a request spent waiting before it could be sent, the time spent negotiating with the proxy server connection, the time spent performing a DNS lookup, and the time it took to establish a connection. HAR file excerpt 1300 includes object identifier 1328. In embodiments, the object identifier 1328 is a unique alphanumeric string used for identifying a particular test case, transaction, or other exchange of information.

FIG. 14 shows an example raw log file excerpt 1400. The raw logfile excerpt includes a first token 1402 which is a timestamp. In the example, the first token is "2020-03-22T18:18:10.437" which indicates a time of Mar. 22, 2020 at a time of 18:18:10.437. The second token 1404 is "92972DB0" which can represent a thread identifier or other unique identifier as previously described. The last token 1428 is the object identifier, which is the same value as object identifier 1328 from 1300. In this way, entries in a raw log file can be correlated to information in a HAR file. Additional metadata 1406 may be available for the raw log file. The additional metadata 1406 can include a file name. In this example, the file name is "p8_server_trace.log." The metadata 1406 can also include line number information, file creation date, file modification date, file size, file hash sum (e.g., md5, sha256, etc.), and/or other associated metadata.

FIG. 15 shows an excerpt of an exemplary logmsgtoken hashmap 1500 in accordance with disclosed embodiments. The logmsgtoken hashmap 1500 can include multiple sections. A header section 1501 can include the corresponding object identifier 1502. Note the value 1503 of the object identifier 1502 is "C0BF0171-0000-C01F-B005-EA1AC236EC42" is the same as the value of 1328 in FIGS. 13 and 1428 in FIG. 14. Thus, the logmsgtoken hashmap 1500, HAR file 1300, and log file 1400 are associated with each other in the creation of a log chain.

The logmsgtoken hashmap 1500 can include a collection id 1504. The value 1505 of the collection id 1504 is shown as "92972DB0" which matches the value token 1404 of FIG. 14, corresponding to a particular thread identifier. The logmsgtoken hashmap 1500 can also include a product component 1506 and log file name 1508. This information may be derived from metadata 1406. The logmsgtoken hashmap 1500 can include multiple logging locations 1513. As shown in FIG. 15, there are two logging locations visible. A first logging location starts at 1506, and has corresponding line number 1768. A second logging location starts at 1514, and has corresponding line number 1776. In practice, there can be many additional logging locations within logmsgtoken hashmap 1500, as indicated by the continuation dots 1518. The logmsgtoken hashmap 1500 provides a structured technique for generating log chains based on test case activity, such as browser-based testing of web/cloud-based services using generated HAR files. These techniques are not limited to test cases, and may also be employed on deployed systems for generating log chains corresponding to deployed software system activity. This enables efficient and accurate processing of log file data to enable reductions in time required to diagnose and address a problem, thereby creating improvements in the technical field of computer system reliability.

As can now be appreciated, disclosed embodiments provide improvements in the technical field of computer system diagnostics. Log files from various components are trimmed, filtered, and combined to form a log chain. A locality-sensitive hashing technique is used to generate an information signature for the log chain. Machine-learning uses the information signature to identify similar information signatures from test cases and/or previously collected logs from deployed software. This enables support engineers to quickly and accurately assess a situation with the logs. Disclosed embodiments can allow a junior level engineer to identify problems that would normally require the years of training and practice of a senior support engineer in order to solve the problem. In this way, the technical field of computer diagnostics is greatly improved.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for log processing, comprising:
    obtaining test case logs having log lines resulting from a computer operation for a test case from a set of devices executing software;
    identifying a marker in the test case logs, the marker being a pattern that is indicative of a problem;
    performing a log trimming operation on the test case logs that discards log lines that are not based on the identified marker; and
    creating a log chain of log lines specific to the problem, wherein the log chain comprises a remainder of the log lines from the plurality of the test case logs that remain from the log trimming operation in chronological order.

2. The computer-implemented method of claim 1, wherein the log chain comprises logs from at least three components.

3. The computer-implemented method of claim 2, wherein the log chain comprises logs from less than 200 components.

4. The computer-implemented method of claim 1, wherein the log chain comprises logs from two adjacent components.

5. The computer-implemented method of claim 1, further comprising filtering the log chain based on a thread identifier.

6. The computer-implemented method of claim 1, further comprising computing an information signature of the log chain using a locality-sensitive hashing technique.

7. The computer-implemented method of claim 6, wherein the locality-sensitive hashing technique comprises a SimHash process.

8. The computer-implemented method of claim 6, wherein the locality-sensitive hashing technique comprises a minhash process.

9. The computer-implemented method of claim 1, further comprising:
    computing a first set of information signatures of a first set of log chains using a locality-sensitive hashing technique;
    performing a supervised machine learning process using a plurality of information signatures corresponding to a first set of log chains;
    computing a second set of information signatures of a second set of log chains using the locality-sensitive hashing technique;
    performing a computerized classification of the second set of log chains via a machine learning process; and
    generating a correlation report, wherein the correlation report includes one or more log chains from the first set of log chains, and one or more log chains from the second set of log chains, and an indication of a correlation between the one or more log chains from the first set of log chains, and the one or more log chains from the second set of log chains.

10. The computer-implemented method of claim 9, wherein the locality-sensitive hashing technique comprises a SimHash process.

11. The computer-implemented method of claim 9, wherein the locality-sensitive hashing technique comprises a minhash process.

12. An electronic computation device comprising:
    a processor;
    a memory coupled to the processor, the memory containing instructions, that when executed by the processor, cause the electronic computation device to:
    obtain test case logs having log lines resulting from a computer operation for a test case from a set of devices executing software;
    identify a marker in the test case logs, the marker being a pattern that is indicative of a problem;
    perform a log trimming operation on the test case logs that discards log lines that are not based on the identified marker; and
    create a log chain of log lines specific to the problem, wherein the log chain comprises a remainder of the log lines from the plurality of the test case logs that remain from the log trimming operation in chronological order.

13. The electronic computation device of claim 12 wherein the memory further comprises instructions, that when executed by the processor, cause the electronic computation device to compute an information signature of the log chain using a locality-sensitive hashing technique.

14. The electronic computation device of claim 13 wherein the memory further comprises instructions, that when executed by the processor, cause the electronic computation device to compute the information signature using a SimHash process.

15. The electronic computation device of claim 13 wherein the memory further comprises instructions, that when executed by the processor, cause the electronic computation device to compute the information signature using a minhash process.

16. The electronic computation device of claim 12 wherein the memory further comprises instructions, that when executed by the processor, cause the electronic computation device to:
    compute a first set of information signatures of a first set of log chains using a locality-sensitive hashing technique;
    perform a supervised machine learning process using a plurality of information signatures corresponding to a first set of log chains;
    compute a second set of information signatures of a second set of log chains using the locality-sensitive hashing technique;
    perform a computerized classification of the second set of log chains via a machine learning process; and
    generate a correlation report, wherein the correlation report includes one or more log chains from the first set of log chains, and one or more log chains from the second set of log chains, and an indication of a correlation between the one or more log chains from the first set of log chains, and the one or more log chains from the second set of log chains.

17. A computer program product for an electronic computation device comprising a computer readable storage medium having program instructions embodied therewith, the program instructions executable by a processor to cause the electronic computation device to:
    obtain test case logs having log lines resulting from a computer operation for a test case from a set of devices executing software;
    identify a marker in the test case logs, the marker being a pattern that is indicative of a problem;
    perform a log trimming operation on the test case logs that discards log lines that are not based on the identified marker; and
    create a log chain of log lines specific to the problem, wherein the log chain comprises a remainder of the log lines from the plurality of the test case logs that remain from the log trimming operation in chronological order.

18. The computer program product of claim 17, wherein the computer readable storage medium includes program instructions executable by the processor to cause the electronic computation device to compute an information signature of the log chain using a locality-sensitive hashing technique.

19. The computer program product of claim 18, wherein the computer readable storage medium includes program instructions executable by the processor to cause the electronic computation device to compute the information signature using a SimHash process.

20. The computer program product of claim 17, wherein the computer readable storage medium includes program instructions executable by the processor to cause the electronic computation device to:
    compute a first set of information signatures of a first set of log chains using a locality-sensitive hashing technique;
    perform a supervised machine learning process using a plurality of information signatures corresponding to a first set of log chains;
    compute a second set of information signatures of a second set of log chains using the locality-sensitive hashing technique;
    perform a computerized classification of the second set of log chains via a machine learning process; and
    generate a correlation report, wherein the correlation report includes one or more log chains from the first set of log chains, and one or more log chains from the second set of log chains, and an indication of a correlation between the one or more log chains from the first set of log chains, and the one or more log chains from the second set of log chains.

* * * * *